(12) United States Patent
Tsuji

(10) Patent No.: US 9,918,150 B2
(45) Date of Patent: Mar. 13, 2018

(54) PON SYSTEM, STATION SIDE APPARATUS, AND SUBSCRIBER SIDE APPARATUS

(75) Inventor: Akihiro Tsuji, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 367 days.

(21) Appl. No.: 13/320,650

(22) PCT Filed: Jun. 8, 2009

(86) PCT No.: PCT/JP2009/060479
§ 371 (c)(1),
(2), (4) Date: Nov. 15, 2011

(87) PCT Pub. No.: WO2010/143258
PCT Pub. Date: Dec. 16, 2010

(65) Prior Publication Data
US 2012/0063770 A1    Mar. 15, 2012

(51) Int. Cl.
*H04J 14/00* (2006.01)
*H04Q 11/00* (2006.01)
(Continued)

(52) U.S. Cl.
CPC ......... *H04Q 11/0067* (2013.01); *H04B 10/27* (2013.01); *H04L 12/12* (2013.01);
(Continued)

(58) Field of Classification Search
None
See application file for complete search history.

(56) References Cited

U.S. PATENT DOCUMENTS 6,574,019 B1    6/2003   Harada
8,565,601 B2   10/2013   Nakura et al.
(Continued)

FOREIGN PATENT DOCUMENTS

CN    101197627    6/2008
JP    61 226898   10/1986
(Continued)

OTHER PUBLICATIONS

Haran et al., ONU power-save annex, Apr. 2008, PMC-Sierra Inc., pp. 1-12.*
(Continued)

*Primary Examiner* — Ken N Vanderpuye
*Assistant Examiner* — David Lambert
(74) *Attorney, Agent, or Firm* — Oblon, McClelland, Maier & Neustadt, L.L.P.

(57) ABSTRACT

An optical line terminal (OLT) that configures a passive optical network (PON) system in cooperation with an optical network unit (ONU). The OLT has a controller to control a link state with the ONU. The controller generates, in one case, a control signal specifying a first low power consumption mode in which the ONU operates in the low power consumption mode in an upstream direction, and generates, in another case, the control signal specifying a second low power consumption mode in which the ONU operates in the low power consumption mode in both upstream and downstream directions. Further, the generated control signal is transmitted to the ONU.

10 Claims, 4 Drawing Sheets

(51) Int. Cl.
*H04B 10/27* (2013.01)
*H04L 12/413* (2006.01)
*H04L 12/12* (2006.01)

(52) U.S. Cl.
CPC .... *H04L 12/413* (2013.01); *H04Q 2011/0079* (2013.01); *Y02B 60/32* (2013.01); *Y02B 60/34* (2013.01)

(56) References Cited

U.S. PATENT DOCUMENTS

| | | | |
|---|---|---|---|
| 8,687,960 | B2 | 4/2014 | Hirano et al. |
| 8,774,621 | B2 | 7/2014 | Mukai |
| 2006/0029389 | A1* | 2/2006 | Cleary ............... H04B 10/806 398/33 |
| 2008/0187312 | A1* | 8/2008 | Kazawa et al. ............... 398/63 |
| 2008/0212964 | A1* | 9/2008 | Gao et al. ............... 398/58 |
| 2009/0263127 | A1* | 10/2009 | Haran ............... H04Q 11/0067 398/38 |
| 2010/0111523 | A1* | 5/2010 | Hirth et al. ............... 398/25 |
| 2010/0118753 | A1* | 5/2010 | Mandin et al. ............... 370/311 |
| 2012/0128357 | A1 | 1/2012 | Mukai et al. |
| 2012/0148246 | A1 | 2/2012 | Mukai et al. |
| 2014/0079396 | A1 | 3/2014 | Hirano et al. |
| 2014/0086584 | A1 | 3/2014 | Mukai et al. |
| 2014/0193150 | A1 | 7/2014 | Mukai et al. |

FOREIGN PATENT DOCUMENTS

| | | | |
|---|---|---|---|
| JP | 05 014380 | | 1/1993 |
| JP | 07 154369 | | 6/1995 |
| JP | 09 064903 | | 3/1997 |
| JP | 2000 115012 | | 4/2000 |
| JP | 2000 196557 | | 7/2000 |
| JP | 2004 064458 | | 2/2004 |
| JP | 2004 289780 | | 10/2004 |
| JP | 2006 237769 | | 9/2006 |
| JP | 2008 113193 | | 5/2008 |
| JP | 2008 193271 | | 8/2008 |
| JP | 2008199253 | A * | 8/2008 |
| JP | 2008 294851 | | 12/2008 |
| JP | 2009 124586 | | 6/2009 |
| JP | 2009-171424 | | 7/2009 |
| JP | 2009-260970 | | 11/2009 |
| JP | 2010-114830 | | 5/2010 |
| JP | 2010-213259 | | 9/2010 |
| RU | 2 407 169 | C1 | 12/2010 |
| WO | WO 02/28019 | A2 * | 4/2002 |

OTHER PUBLICATIONS

Mandin et al. U.S. Appl. No. 61/147,103.*
International Telecommunication Union, "GPON power conservation", ITU-T Telecommunication Standardization Sector of ITU, Series G, Supplement 45, Total 44 pages, (May 2009).*
International Search Report dated Jul. 7, 2009 in PCT/JP09/060479 filed Jun. 8, 2009.
Japanese Office Action dated Dec. 6, 2011 in patent application No. 2011-518158 with English translation.
Japanese Decision of a Patent Grant dated Feb. 21, 2012 in patent application No. 2011-518158 with English translation.
Office Action dated Oct. 9, 2012, in Russian Patent Application No. 2011146138/08 (with English-language translation).
Extended European Search Report dated Feb. 8, 2013, in European Patent Application No. 09845783.1.
Office Action dated Feb. 15, 2013, in Korean Patent Application No. 10-2011-7027156 (with English-language translation).
Office Action dated Sep. 13, 2013, in Chinese Patent Application No. 200980159057.3 (with English-language translation).
International Telecommunication Union, "White Paper: Means and impact of GPON power conservation", Telecommunication Standardization Sector, Study Group 15, TD97 (WP 1/15), (Dec. 2008), XP17444919A.
International Telecommunication Union, "Amendment 1—Specification of the ONU registration method and various clarifications", ITU-T Telecommunication Standardization Sector of ITU, Series G, G.984.3, Amendment 1, Series G: Transmission Systems and Media, Digital Systems and Networks, Digital sections and digital line system—Optical line systems for local and access networks, Gigabit-capable Passive Optical networks (G-PON). Transmission convergence layer specification, Total 16 pages, (Feb. 2009), XP17436107A.
Mangin, Christopher and Mukai, Hiroaki, "Type B Optical Link Protection", Draft Contribution to IEEE 1904.1, TF3,Total 7 pages, (Server Date Oct. 18, 2010), XP17737894A.
IEEE P 1904.1, "Service iteroperability in Ethernet Passive Optical Networks (SIEPON)", pp. 9-1 to 9-18,(Aug. 2010), XP17739757A.
Draft Amendment to IEEE Std. 802.3-2008, IEEE 802.3zv 10G-EPON Task Force, IEEE Draft P802.3av/D1.3, Section 93. Multipoint MAC Control, (Apr. 2008).
Chinese Office Action for corresponding Chinese Application No. 200980159057.3 dated Jun. 27, 2014 (with partial English translation).
Indian Office Action dated Sep. 28, 2017, issued in Indian Patent Application No. 8391/CHENP/2011 (with English translation).

* cited by examiner

PON SYSTEM, STATION SIDE APPARATUS, AND SUBSCRIBER SIDE APPARATUS

FIELD

The present invention relates to a PON (Passive Optical Network) system employing an Ethernet (registered trademark) technology.

BACKGROUND

In the past, in an access network for connecting a station and a user home, a PON system, which is one type of an FTTH (Fiber To The Home), rapidly spreads because high speed and economy can be attained. In the PON system, a plurality of subscriber side apparatuses (ONUs: Optical Network Units) are connected to a station side apparatus (OLT: Optical Line Termination) via an optical splitter that diverts a signal output to a plurality of optical fibers. TE (Terminal Equipment) is connected to the ONUs via a LAN cable. The TE is, for example, an HGW (Home Gate Way), a VoIP-TA (Voice over Internet Protocol-Terminal Adapter), a PC, or the like.

The ONU set in the user home needs to always establish, to provide a service requiring real time property such as an optical telephone, a link to the OLT and the TE even when data communication is not performed (during standby). There is a problem in that power consumption of the ONU is large.

To solve the problem, Patent Literature 1 described below discloses a method in which, in each-call control of a PDS (passive double start) configuration, a specific pattern is set for each terminal line terminating apparatus and, in incoming call, the terminal line terminating apparatus compares a specific pattern transmitted from an intra-office line terminating apparatus and the set (registered) pattern in the terminal line terminating apparatus and performs, only when the patterns coincide with each other, an incoming operation to suppress unnecessary power consumption.

Patent Literature 2 described below discloses a method of suppressing unnecessary power consumption by stopping, when there is no exchange of valid data between a modem and a line card in an ATM (Asynchronous Transfer Mode) apparatus, functions of the modem and a transmitting unit of the line card.

Patent Literature 3 discloses a method of monitoring states of a logical link and a physical link in an ONU of a PON system and controlling a mounted circuit in the ONU to a low power consumption mode in a state in which the links are disconnected.

Patent Literature 1: Japanese Patent Application Laid-open No. H09-64903
Patent Literature 2: Japanese Patent Application Laid-open No. 2004-64458
Patent Literature 3: Japanese Patent Application Laid-open No. 2008-113193

SUMMARY

Technical Problem

However, according to the methods disclosed in Patent Literatures 1 and 2, the methods operate only when predetermined conditions for performing communication are satisfied. Therefore, there is a problem in that a link state between the intra-office line terminating apparatus and a subscriber line terminating apparatus cannot be maintained.

In the method disclosed in Patent Literature 3, only presence or absence of a link is set as a reference serving as a trigger for transitioning to the low power consumption mode. There is a problem in that it is not assumed that a link is established but user data is not present and a power consumption reducing operation in this case is not indicated.

The present invention has been devised in view of the above and it is an object of the present invention to obtain a PON system that can execute a reduction in power consumption of an ONU while maintaining a link between an OLT and the ONU.

Solution to Problem

In order to solve above-mentioned problems and to achieve the object, according to an exemplary aspect of this disclosure an optical line terminal (hereinafter referred to as OLT) can be provided, which configures a PON system in cooperation with an optical network unit (hereinafter referred to as ONU). The OLT can include a control unit that controls a link state with the ONU, wherein the control unit can generate a control signal concerning transition to a low power consumption mode of the ONU and transmit the generated control signal to the ONU. When the ONU operates in the low power consumption mode based on the control signal transmitted from the OLT, the link state between the OLT and the ONU can be maintained. When the ONU operates in the low power consumption mode in an upstream direction, the control unit can allocate an upstream bandwidth to the ONU.

According to an another exemplary aspect of this disclosure, an optical line terminal (hereinafter referred to as OLT) can configure a PON system in cooperation with an optical network unit (hereinafter referred to as ONU). The OLT can comprise a control unit that controls a link state with the ONU. The control unit can generate a control signal concerning transition to a low power consumption mode of the ONU and transmit the generated control signal to the ONU. When the ONU operates in the low power consumption mode based on the control signal transmitted from the OLT, the link state between the OLT and the ONU can be maintained. When the ONU operates in the low power consumption mode in an upstream direction, the control unit inquires the ONU about an upstream bandwidth allocation and allocates an upstream bandwidth to the ONU based on a response to the inquiry from the ONU.

According to an another exemplary aspect of this disclosure, an optical line terminal (hereinafter referred to as OLT) can configure a PON system in cooperation with an optical network unit (hereinafter referred to as ONU). The OLT can comprise a control unit that controls a link state with the ONU. The control unit can generate a control signal concerning transition to a low power consumption mode of the ONU and can transmit the generated control signal to the ONU. When the ONU operates in the low power consumption mode based on the control signal transmitted from the OLT, the link state can be maintained between the OLT and the ONU. When the ONU operates in the low power consumption mode in an upstream direction, the control unit can inquire the ONU about an upstream bandwidth allocation and receive a message concerning a release of the low power consumption mode of the ONU transmitted from the ONU in a predetermined period in which the ONU can respond to the inquiry.

According to an another exemplary aspect of this disclosure, an optical line terminal (hereinafter referred to as OLT) can configure a PON system in cooperation with an optical network unit (hereinafter referred to as ONU). The OLT can comprise a control unit. The control unit can generate, based on an upstream traffic received from the ONU, the control signal concerning the transition to the low power consumption mode of the ONU and transmit the generated control signal to the ONU. When the ONU operates in the low power consumption mode based on the control signal transmitted from the control unit, the link state between the OLT and the ONU can be maintained.

According to another aspect of this disclosure an optical network unit (hereinafter referred to as ONU) can configure a PON system in cooperation with an optical line terminal (hereinafter referred to as OLT), the ONU can receive a control signal concerning an operation mode of the ONU transmitted from the OLT in a state in which the OLT and the ONU are linked to each other. The ONU can transition to a low power consumption mode based on the control signal. The ONU, when transitioned to the low power consumption mode, can perform an operation in the low power consumption mode in a state in which the ONU and the OLT are maintained to be linked to each other. When operating in the low power consumption mode in an upstream direction and in a non-low power consumption mode in a downstream direction, the ONU can receive a downstream traffic transmitted from the OLT.

According to another aspect of this disclosure, a communication system can comprise an optical line terminal (hereinafter referred to as OLT) and an optical network unit (hereinafter referred to as ONU). The communication system can perform communication in a state in which the OLT and the ONU are linked. The OLT can include: a generating unit that generates a control signal concerning transition to a low power consumption mode of the ONU; a transmitting unit that transmits the control signal generated by the generating unit to the ONU; and a control unit that allocates an upstream bandwidth to the ONU, when the operating mode based on the control signal transmitted by the transmitting unit is a low power consumption mode of the ONU operating in an upstream direction. The ONU can include: a receiving unit that receives the control signal transmitted from the OLT; and a transition executing unit that executes the transition to the low power consumption mode based on the control signal received by the receiving unit. The control unit can refrain from discontinuing a link state between the OLT and the ONU when the ONU transitioned to the low power consumption mode operates in the low power consumption mode.

According to another aspect of this disclosure, a communication method for a communication system can be provided. The communication system can include an optical line terminal (hereinafter referred to as OLT) and an optical network unit (hereinafter referred to as ONU). The communication system can perform communication in a link state in which the OLT and the ONU are linked. The communication method can comprise: a first step of the OLT generating a control signal concerning transition to a low power consumption mode of the ONU; a second step of the OLT transmitting the generated control signal to the ONU; a third step of the ONU receiving the transmitted control signal; a fourth step of the ONU transitioning to the low power consumption mode based on the received control signal; a fifth step of restraining the link state from being discontinued when the ONU transitioned to the low power consumption mode operates in the low power consumption mode; and a sixth step of the OLT allocating an upstream bandwidth to the ONU, when the ONU operates in the lower power consumption mode in an upstream direction based on the control signal received by the third step.

Advantageous Effects of Invention

The PON system according to the present invention realizes an effect that it is possible to reduce power consumption of the subscriber side apparatus while maintaining a link.

REFERENCE SIGNS LIST

1 HOST APPARATUS
2, 2B, 2C, 2D OLTs
3 SPLITTER
4, 4B, 4C, 4D ONUs
10 TE
21 BUFFER UNIT
22 FRAME MULTIPLEXING UNIT
23 LIGHT TRANSMITTING UNIT
24 LIGHT RECEIVING UNIT
25 FRAME SEPARATING UNIT
26 PON CONTROL UNIT
27 DOWNSTREAM-TRAFFIC MONITORING UNIT
28 LINK MANAGING UNIT
29 POWER-CONSUMPTION-REDUCTION DETERMINING UNIT
30 UPSTREAM-TRAFFIC MONITORING UNIT
41 BUFFER UNIT
42 FRAME MULTIPLEXING UNIT
43 LIGHT TRANSMITTING UNIT
44 LIGHT RECEIVING UNIT
45 FRAME SEPARATING UNIT
46 PON CONTROL UNIT
47 UPSTREAM-TRAFFIC MONITORING UNIT
48, 48C POWER-CONSUMPTION-REDUCTION-BLOCK DETERMINING UNITS
49 POWER-CONSUMPTION-REDUCTION INSTRUCTING AND CANCELLING UNIT
50 DOWNSTREAM-TRAFFIC MONITORING UNIT

DESCRIPTION OF EMBODIMENTS

Embodiments of a PON system according to the present invention are explained in detail below based on the drawings. The present invention is not limited by the embodiments.

First Embodiment

Figure 1:
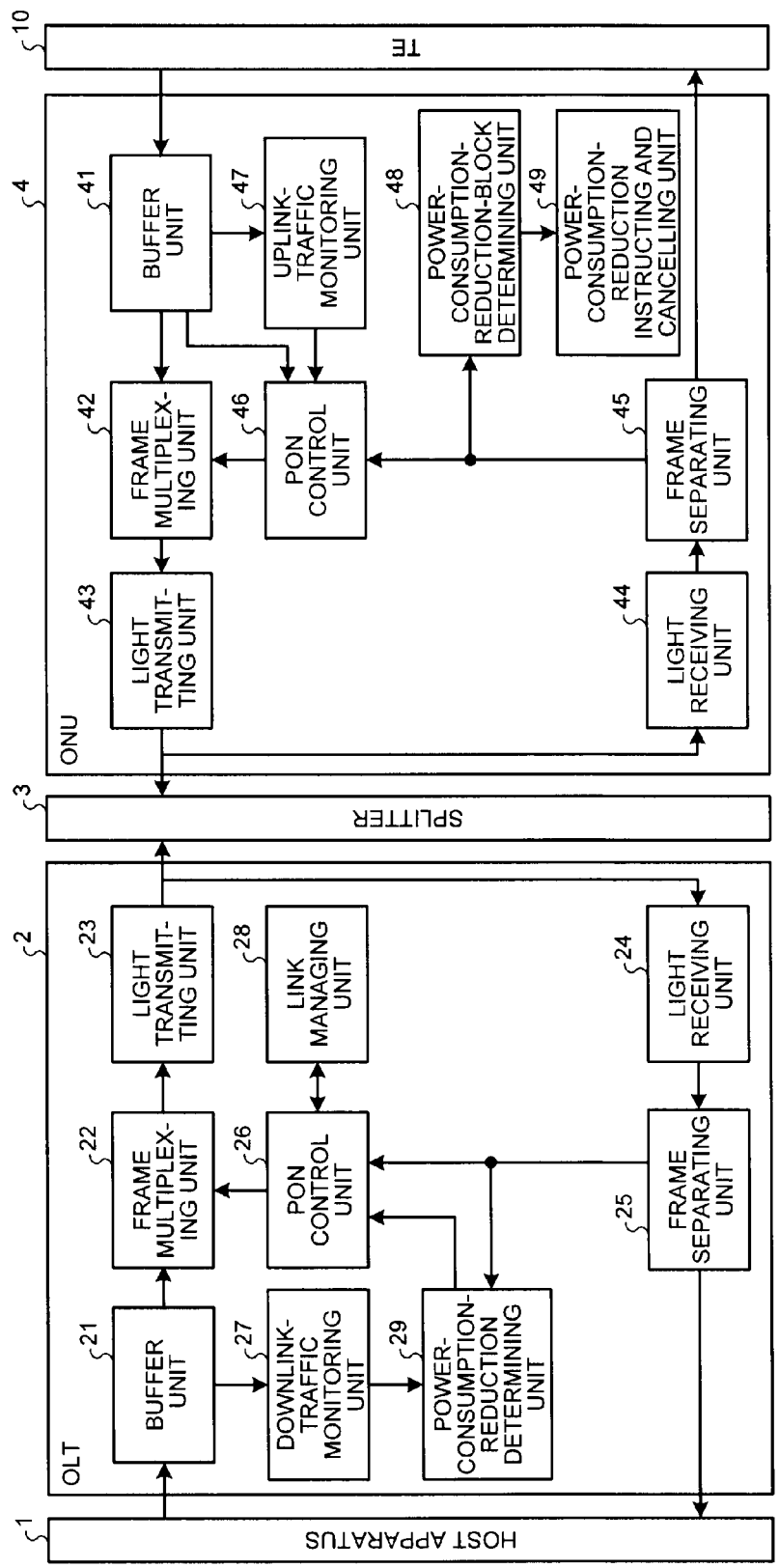
FIG. 1 is a diagram of a configuration example of a PON system according to a first embodiment.

FIG. 1 is a diagram of a configuration example of a PON system according to a first embodiment. The PON system shown in FIG. 1 includes a host apparatus 1, an OLT 2, which is a station side apparatus, a splitter 3, an ONU 4, which is a subscriber side apparatus, and a TE 10. In FIG. 1, one ONU 4 and one TE 10 are shown. However, actually, it is possible to connect a plurality of ONUs and a plurality of TEs. The host apparatus 1 manages the OLT 2 set on a network side. The splitter 3 diverts a light signal from the OLT 2 and transmits the light signal to the ONU 4. The TE 10 is, for example, a HGW, a VoIP-TA, or a PC.

The OLT 2 includes a buffer unit 21, a frame multiplexing unit 22, a light transmitting unit 23, a light receiving unit 24, a frame separating unit 25, a PON control unit 26, a downstream-traffic monitoring unit 27, a link managing unit 28, and a power-consumption-reduction determining unit 29. The buffer unit 21 temporarily accumulates data received from the host apparatus 1. The frame multiplexing unit 22 multiplexes a user frame and a control frame. The light transmitting unit 23 converts an electric signal output from the frame multiplexing unit 22 into a light signal and transmits the light signal to the ONU 4. The light receiving unit 24 receives the light signal from the ONU 4 and converts the light signal into the electric signal. The frame separating unit 25 separates the control frame and the user frame. The PON control unit 26 processes the control frame transmitted and received between the OLT 2 and the ONU 4. The downstream-traffic monitoring unit 27 monitors presence or absence of a downstream traffic. The link managing unit 28 manages a link state between the OLT 2 and the ONU 4. The power-consumption-reduction determining unit 29 determines an ONU and a communication direction subjected to power consumption reduction.

The ONU 4 includes a buffer unit 41, a frame multiplexing unit 42, a light transmitting unit 43, a light receiving unit 44, a frame separating unit 45, a PON control unit 46, an upstream-traffic monitoring unit 47, a power-consumption-reduction-block determining unit 48, and a power-consumption-reduction instructing and cancelling unit 49. The buffer unit 41 temporarily accumulates data from the TE 10. The frame multiplexing unit 42 multiplexes a user frame and a control frame. The light transmitting unit 43 converts electric signal from the ONU 4 into a light signal and transmits the light signal to the OLT 2. The light receiving unit 44 receives the light signal from the OLT 2 and converts the light signal into the electric signal. The frame separating unit 45 separates the control frame and the user frame. The PON control unit 46 processes the control frame transmitted and received between the ONU 4 and the OLT 2. The upstream-traffic-monitoring unit 47 monitors a data amount of the buffer unit 41 to monitor an upstream traffic. The power-consumption-reduction-block determining unit 48 determines blocks subjected to power consumption reduction. The power-consumption-reduction instructing and cancelling unit 49 instructs the blocks determined by the power-consumption-reduction-block determining unit 48 to reduce power consumption or cancels the power consumption reduction.

In the PON system, as usual operations, to maintain a link, the PON control unit 26 of the OLT 2 and the PON control unit 46 of the ONU 4 periodically exchange a control frame (explained later), check content of the control frame, and perform data communication only when the link is maintained.

The operations of the PON system configured as explained above are explained. The operations are divided into cases as explained below based on states of a link in a PON section and states of upstream and downstream traffics.

(Case 1-1) The Link in the PON Section is Established and There is no Traffic Both in an Upstream and a Downstream The upstream-traffic monitoring unit 47 of the ONU 4 monitors the buffer unit 41 to monitor an upstream traffic from the TE 10. When there is no accumulated data amount for a predetermined time, the upstream-traffic monitoring unit 47 detects that there is no upstream traffic from the TE 10. In this case, the upstream-traffic monitoring unit 47 notifies the PON control unit 46 that there is no upstream traffic. On the other hand, as a usual operation, the OLT 2 periodically transmits a control frame for inquiring an accumulated data amount (hereinafter referred to as "inquiry frame") for the purpose of checking a link and calculating bandwidth allocation. When the PON control unit 46 receives the inquiry frame via the light receiving unit 44 and the frame separating unit 45, the PON control unit 46 transmits a control frame including an accumulated data amount notified from the buffer unit 41 (hereinafter referred to as "inquiry response frame"). Because the PON control unit 46 is notified by the upstream-traffic monitoring unit 47 that there is no upstream traffic, the PON control unit 46 further includes, in the control frame, indication that there is no upstream traffic.

The power-consumption-reduction determining unit 29 of the OLT 2 receives the inquiry response frame via the light receiving unit 24 and the frame separating unit 25. The downstream-traffic monitoring unit 27 monitors a data accumulation state of the buffer unit 21. When there is no data addressed to the ONU 4 for a fixed time, the downstream-traffic monitoring unit 27 notifies the power-consumption-reduction determining unit 29 that there is no traffic addressed to the ONU 4. Consequently, the power-consumption-reduction determining unit 29 is notified that there is no accumulated data in the ONU 4 and there is no traffic addressed to the ONU 4. Therefore, the power-consumption-reduction determining unit 29 determines that there are no upstream and downstream traffics between the OLT 2 and the ONU 4, determines to transition the ONU 4 to a low power consumption mode in both upstream and downstream directions, and instructs the PON control unit 26 to notify to that effect. The PON control unit 26 transmits a control frame (hereinafter referred to as "transition instruction frame") including contents of the notification (the transition to the low power consumption mode and a communication direction to be transitioned) to the ONU 4 via the frame multiplexing unit 22 and the light transmitting unit 23.

The power-consumption-reduction-block determining unit 48 of the ONU 4 receives the transition instruction frame via the light receiving unit 44 and the frame separating unit 45. The power-consumption-reduction-block determining unit 48 transitions, according to an instruction in the transition instruction frame, i.e., an instruction for transitioning upstream and downstream of the ONU 4 to the low power consumption mode, a block for receiving data from the OLT 2 and transmitting the data to the TE 10, a block for receiving data from the TE 10 and transmitting the data to the OLT 2, and blocks necessary for communication control with the OLT 2 to the low power consumption mode. The power-consumption-reduction-block determining unit 48 determines the frame multiplexing unit 42, the light transmitting unit 43, the light receiving unit 44, the frame separating unit 45, the PON control unit 46, the upstream-traffic monitoring unit 47, and the power-consumption-reduction-block determining unit 48 as blocks transitioned to the low power consumption mode and notifies the power-consumption-reduction instructing and cancelling unit 49.

The power-consumption-reduction instructing and cancelling unit 49 designates, for example, time determined in the PON system in advance and set in the ONU 4 and instructs the blocks to transition to the low power consumption mode. The "time" in the ONU 4 is hereinafter also referred to as "low power consumption operation time". The time may be indicated in the transition instruction frame transmitted by the OLT 2.

The PON control unit 26 of the OLT 2 can predict that communication between the OLT 2 and the ONU 4 is interrupted while the ONU 4 transitions to the low power consumption mode according to the instruction of the transition instruction frame. Therefore, to prevent the link between the OLT 2 and the ONU 4 from being disconnected, the PON control unit 26 stops the processing for monitoring the link until time determined by the PON system in advance and set in the OLT 2 (or time designated in the transition instruction frame transmitted from the OLT 2) elapses. In other words, the PON control unit 26 stops the periodic inquiry frame transmission to the relevant ONU (the ONU 4) and maintains a link state stored by the link managing unit 28.

During this time, when traffic addressed to the relevant ONU (the ONU 4) arrives from the host apparatus 1, the OLT 2 accumulates the traffic in the buffer unit 21.

Similarly, when traffic addressed to the OLT 2 arrives from the TE 10, the ONU 4 accumulates the traffic in the buffer unit 41.

When the low power consumption mode operation time expires in the ONU 4, the power-consumption-reduction instructing and cancelling unit 49 of the ONU 4 transmits an instruction for cancelling the low power consumption mode to the blocks and activates the blocks. When the low power consumption mode operation time expires in the OLT 2, the PON control unit 26 of the OLT 2 resumes the periodic inquiry transmission to the relevant ONU (the ONU 4) to resume the link monitoring.

Consequently, when there are no upstream and downstream traffics in the ONU 4, it is possible to reduce power consumption of blocks unnecessary for communication between the ONU 4 and the OLT 2 while maintaining the link between the ONU 4 and the OLT 2. Concerning traffics that occur while the ONU 4 operates in the low power consumption mode, a downstream traffic is accumulated in the buffer unit 21 of the OLT 2 and an upstream traffic is accumulated in the buffer unit 41 of the ONU 4 and the traffics are transmitted and received during the resumption. Therefore, the ONU 4 can operate in the low power consumption mode while preventing occurrence of a frame loss.

(Case 1-2) The Link in the PON Section is Established and Only a Downstream Traffic is not Present Operations performed when only a downstream traffic stops are explained. The downstream-traffic monitoring unit 27 of the OLT 2 monitors a data accumulation state of the buffer unit 21. When there is no data addressed to the ONU 4 for a fixed time, the downstream-traffic monitoring unit 27 notifies the power-consumption-reduction determining unit 29 that there is no downstream traffic addressed to the ONU 4. The power-consumption-reduction determining unit 29 recognizes that there is accumulated data in the ONU 4 referring to the inquiry response frame from the ONU 4 transmitted as explained above. Consequently, the power-consumption-reduction determining unit 29 of the OLT 2 determines that only a downstream traffic to the ONU 4 is not present. Therefore, the power-consumption-reduction determining unit 29 determines to transition a downstream direction from the own apparatus to the ONU 4 to the low power consumption mode and instructs the PON control unit 26 to notify to that effect. The PON control unit 26 transmits a transition instruction frame including content of the notification to the ONU 4 via the frame multiplexing unit 22 and the light transmitting unit 23.

When the power-consumption-reduction-block determining unit 48 of the ONU 4 receives the transition instruction frame via the light receiving unit 44 and the frame separating unit 45, the power-consumption-reduction-block determining unit 48 determines to transition a block for receiving data from the OLT 2 and transmitting the data to the TE 10 and blocks necessary for communication control with the OLT 2 to the low power consumption mode. The power-consumption-reduction-block determining unit 48 determines the light receiving unit 44, the frame separating unit 45, the PON control unit 46, the upstream-traffic monitoring unit 47, and the power-consumption-reduction-block determining unit 48 as blocks to be transitioned to the low power consumption mode and notifies the power-consumption-reduction instructing and cancelling unit 49 to that effect.

The power-consumption-reduction instructing and cancelling unit 49 designates the low power consumption operation time and instructs the blocks to transition to the low power consumption mode.

The PON control unit 26 of the OLT 2 can predict that communication between the OLT 2 and the ONU 4 is interrupted while the ONU 4 transitions to the low power consumption mode according to the instruction of the transition instruction frame. Therefore, to prevent the link between the OLT 2 and the ONU 4 from being disconnected, the PON control unit 26 stops the processing for monitoring the link until time determined by the PON system in advance and set in the OLT 2 (or time designated in the transition instruction frame transmitted from the OLT 2) elapses. In other words, the PON control unit 26 stops the periodic inquiry frame transmission to the relevant ONU (the ONU 4) and maintains a link state stored by the link managing unit 28.

The blocks concerning exchange of control information between the ONU 4 and the OLT 2 are transitioned to the low power consumption mode together with the blocks concerning a downstream traffic. Therefore, because the ONU 4 cannot transmit control information even if an upstream traffic occurs, upstream transmission permission is not obtained. As measures against this problem, the PON control unit 26 of the OLT 2 transmits, according to the low power consumption operation time or the like, upstream transmission permission in future to the ONU 4 using statistic information up to this point stored by the PON control unit 26, minimum bandwidth guarantee information in the PON system, and the like. While the ONU 4 transitions to the low power consumption mode, when traffic addressed to the relevant ONU (the ONU 4) arrives from the host apparatus 1, the OLT 2 accumulates the traffic in the buffer unit 21.

When the low power consumption operation time in the ONU 4 expires, the power-consumption-reduction instructing and cancelling unit 49 of the ONU 4 instructs the blocks to cancel the low power consumption mode and activates the blocks. On the other hand, in the OLT 2, when the time in which the ONU 4 transitions to the low power consumption mode expires, the link managing unit 28 resumes instructing the PON control unit 26 to periodically transmit the inquiry frame to the relevant ONU (the ONU 4) to resume the link monitoring.

Consequently, when there is no downstream traffic, the link is maintained and the upstream traffic transmission permission is given in advance. Therefore, it is possible to reduce power consumption of the blocks unnecessary for transmission of a downstream traffic. The buffer unit 21 of the OLT 2 accumulates a downstream traffic that occurs during the transition to the low power consumption mode and transmits the downstream traffic when the downstream traffic is resumed. Therefore, it is possible to prevent occurrence of a frame loss.

(Case 1-3) The Link in the PON Section is Established and Only an Upstream Traffic is not Present Operations performed when only an upstream traffic stops are explained. As explained above, the buffer unit 41 of the ONU 4 notifies the PON control unit 46 of a data accumulation amount. The upstream-traffic monitoring unit 47 monitors an upstream traffic from the TE 10. When the upstream-traffic monitoring unit 47 detects that there is no upstream traffic from the TE 10 for a fixed time, the upstream-traffic monitoring unit 47 notifies the PON control unit 46 to that effect. When the PON control unit 46 receives an inquiry frame from the OLT 2 via the light receiving unit 44 and the frame separating unit 45, the PON control unit 46 creates an inquiry response frame including a data accumulation amount notified from the buffer unit 41. The PON control unit 46 performs, according to the notification from the upstream-traffic monitoring unit 47, control for returning the inquiry response frame with indication that there is no upstream traffic further included in the inquiry response frame.

When the power-consumption-reduction determining unit 29 of the OLT 2 receives the inquiry response frame via the light receiving unit 24 and the frame separating unit 25, the power-consumption-reduction determining unit 29 recognizes that there is no accumulated data amount in the ONU 4. On the other hand, the downstream-traffic monitoring unit 27 does not detect that there is no downstream traffic. Therefore, the power-consumption-reduction determining unit 29 determines that only an upstream traffic from the ONU 4 is not present. The power-consumption-reduction determining unit 29 determines transition to the low power consumption mode concerning the upstream direction from the ONU 4 and instructs the PON control unit 26 to notify to that effect. The PON control unit 26 transmits a transition instruction frame for instructing transition to the low power consumption mode concerning the upstream direction to the ONU 4.

When the power-consumption-reduction-block determining unit 48 of the ONU 4 receives the transition instruction frame via the light receiving unit 44 and the frame separating unit 45, the power-consumption-reduction-block determining unit 48 determines to transition a block for receiving data from the TE 10 and transmitting the data to the OLT 2 and blocks necessary for communication control with the OLT 2 to the low power consumption mode. The power-consumption-reduction-block determining unit 48 determines the frame multiplexing unit 42 and the light transmitting unit 43 (blocks concerning transmission processing) and the PON control unit 46, the upstream-traffic monitoring unit 47, and the power-consumption-reduction-block determining unit 48 (blocks concerning communication control) as blocks to be transitioned to the low power consumption mode and notifies the power-consumption-reduction instructing and cancelling unit 49 to that effect.

The power-consumption-reduction instructing and cancelling unit 49 designates the low power consumption operation time and instructs the blocks to transition to the low power consumption mode.

The PON control unit 26 of the OLT 2 can predict that communication between the OLT 2 and the ONU 4 is interrupted while the ONU 4 transitions to the low power consumption mode according to the instruction of the transition instruction frame. Therefore, to prevent the link between the OLT 2 and the ONU 4 from being disconnected, the PON control unit 26 stops the processing for monitoring the link until time determined by the PON system in advance and set in the OLT 2 (or time designated in the transition instruction frame transmitted from the OLT 2) elapses. In other words, the PON control unit 26 stops the periodic inquiry frame transmission to the relevant ONU (the ONU 4) and maintains a link state stored by the link managing unit 28.

When traffic addressed to the OLT 2 arrives from the TE 10 in the ONU 4 until the low power consumption operation time elapses, the buffer unit 41 accumulates the traffic. When the low power consumption operation time in the ONU 4 expires, the power-consumption-reduction instructing and cancelling unit 49 of the ONU 4 instructs the blocks to cancel the low power consumption mode and activates the blocks. On the other hand, in the OLT 2, when the time in which the ONU transitions to the low power consumption mode expires, the link managing unit 28 resumes the instruction for the periodic inquiry frame transmission to the relevant ONU (the ONU 4) to resume the link monitoring.

Consequently, when there is no upstream traffic from the ONU, it is possible to reduce power consumption of the blocks unnecessary for transmission of a upstream traffic. An upstream traffic that occurs during the transition to the low power consumption mode is accumulated in the buffer unit of the ONU and transmitted when communication is resumed. Therefore, it is possible to prevent a frame loss.

In the operations performed when traffic stops only in the upstream, the periodic inquiry processing from the OLT to the relevant ONU is stopped. However, the periodic inquiry can be continuously carried out while the link stored by the link managing unit is maintained. In this case, as in the case explained above, the inquiry frame is periodically transmitted and the light receiving unit 44 and the frame separating unit 45 receive the inquiry frame. When an urgent traffic arrives at the ONU 4, the buffer unit 41 notifies the power-consumption-reduction instructing and cancelling unit 49 to that effect. The power-consumption-reduction instructing and cancelling unit 49 that receives the notification instructs the respective units to cancel the low power consumption mode. Consequently, the activated PON control unit 46 can obtain upstream transmission permission by receiving the inquiry frame, which is transmitted from the OLT 2, from the frame separating unit 45 and returning an inquiry response frame in response to the inquiry frame. Consequently, in an urgent case, the ONU 4 can leave the low power consumption mode earlier than the time determined in advance expires and transmit upstream data.

(Case 1-4) The Link in the PON Section is Disconnected

Lastly, operations performed when the link between the ONU 4 and the OLT 2 is disconnected are explained. To maintain the link, the OLT 2 and the ONU 4 periodically exchange inquiry frames and inquiry response frames between the PON control units of the OLT 2 and the ONU 4, check contents of the frames, and perform data communication only when the link is maintained.

When the inquiry frame is not detected for a fixed time, the power-consumption-reduction-block determining unit 48 of the ONU 4 cannot check the link. Therefore, the power-consumption-reduction-block determining unit 48 determines the blocks except only the frame multiplexing unit 42, the light transmitting unit 43, the light receiving unit 44, the frame separating unit 45, and the PON control unit 46, which are blocks necessary for communication control with the OLT 2, as blocks to be transitioned to the low power consumption mode and notifies the power-consumption-reduction instructing and cancelling unit 49 to that effect.

The power-consumption-reduction instructing and cancelling unit 49 of the ONU 4 instructs the relevant blocks to transition to the low power consumption mode until the link of the PON (the link between the ONU 4 and the OLT 2) is recovered. When the link is recovered and an inquiry frame is received from the OLT 2 via the light receiving unit 44 and the frame separating unit 45, the power-consumption-reduction-block determining unit 48 issues an instruction for transition cancellation. The power-consumption-reduction instructing and cancelling unit 49 that receives the instruction issues an instruction for activating the units. Consequently, a low power consumption effect corresponding to a state without the link can be obtained while a state in which the link between the ONU 4 and the OLT 2 can be recovered is maintained.

As explained above, in this embodiment, the ONUs monitor upstream traffics from the ONUs to the OLT and report the upstream traffics to the OLT and the OLT monitors downstream traffics. According to results of the monitoring, the OLT is configured to determine the ONU and a communication direction to be transitioned to the low power consumption mode and instruct the ONU to transition. The ONU that receives the instruction is configured to transition a function unit corresponding to the communication direction to the low power consumption mode for a fixed time. The OLT is configured to stop processing of link check until the fixed time elapses and prevent a link from being regarded as disconnected. When the ONU cannot check a link, the OLT is configured so that while a function for performing a link is maintained, other functions are transitioned to the low power consumption mode. Consequently, it is possible to reduce power consumption in the ONU while maintaining a link between the OLT and the ONU or maintaining a state in which the OLT and the ONU can be linked.

Second Embodiment

In the first embodiment, the OLT monitors traffics in the upstream direction and the downstream direction between the OLT and the ONUs. The ONUs monitor traffics in the upstream direction from the ONUs and report the traffics to the OLT. In a second embodiment, the OLT monitors upstream traffics.

Figure 2:
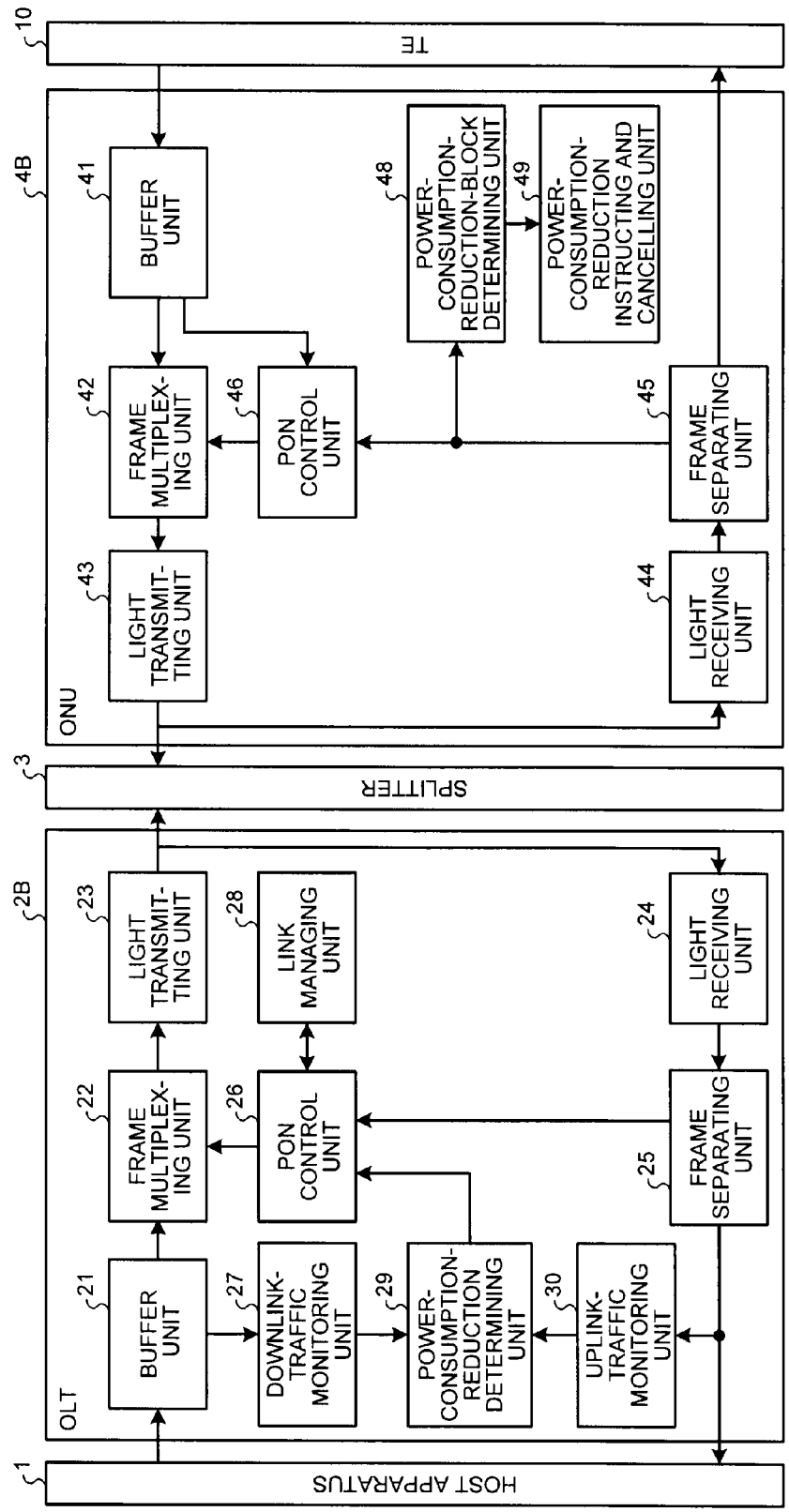
FIG. 2 is a diagram of a configuration example of a PON system according to a second embodiment.

FIG. 2 is a diagram of a configuration example of a PON system according to this embodiment. In the configuration shown in FIG. 2, compared with the configuration shown in FIG. 1, the PON system includes an OLT 2B instead of the OLT 2 and includes an ONU 4B instead of the ONU 4. The ONU 4B does not include the upstream-traffic monitoring unit 47. Instead, the OLT 2 includes an upstream-traffic monitoring unit 30. The upstream-traffic monitoring unit 30 is provided for the purpose of monitoring an upstream traffic from the ONU 4B.

The upstream-traffic monitoring unit 30 of the OLT 2 monitors a user frame transferred to the host apparatus 1 via the light receiving unit 24 and the frame separating unit 25. Consequently, the traffic monitoring unit 30 plays a function equivalent to that of the upstream-traffic monitoring unit 47 shown in FIG. 1.

Operations in the PON system configured as explained above are explained. In an example explained below, only an upstream traffic from the ONU 4B to the OLT 2B stops.

The upstream-traffic monitoring unit 30 of the OLT 2B monitors a user frame transferred to the host apparatus 1 via the light receiving unit 24 and the frame separating unit 25. When no user frame is detected for a fixed period, the upstream-traffic monitoring unit 30 determines that there is no upstream traffic and notifies the power-consumption-reduction determining unit 29 to that effect. The power-consumption-reduction determining unit 29 that receives the notification determines transition to the low power consumption mode only in an upstream direction to the relevant ONU (the ONU 4B) and instructs the PON control unit 26 to notify to that effect. The PON control unit 26 transmits a transition instruction frame for instructing transition to the low power consumption mode concerning the upstream direction to the ONU 4B.

The ONU 4B performs processing for transition to the low power consumption mode as in the "case 1-3" of the first embodiment. Thereafter, as explained above, when a low power consumption operation time in the ONU 4B expires, the power-consumption-reduction instructing and cancelling unit 49 of the ONU 4B instructs cancellation of the low power consumption mode and activates the blocks. On the other hand, in the OLT 2B, when time in which the ONU 4B transitions to the low power consumption mode expires, the PON control unit 26 resumes the periodic inquiry transmission to the relevant ONU (the ONU 4) to resume the link monitoring.

As explained above, in this embodiment, the OLT is configured to monitor both upstream traffics from the ONUs to the OLT and downstream traffics from the OLT to the ONUs. According to results of the monitoring, the OLT is configured to determine the ONU and a communication direction to be transitioned to the low power consumption mode and instructs the ONU to transition. In this case, as in the first embodiment, it is possible to reduce power consumption in the ONU while maintaining a link between the OLT and the ONU or maintaining a state in which the OLT and the ONU can be linked.

Third Embodiment

In the first and second embodiments, the OLT side determines an ONU and a communication direction subjected to power consumption reduction. In a third embodiment, an ONU determines whether power consumption reduction is performed and a communication direction of the power consumption reduction.

Figure 3:
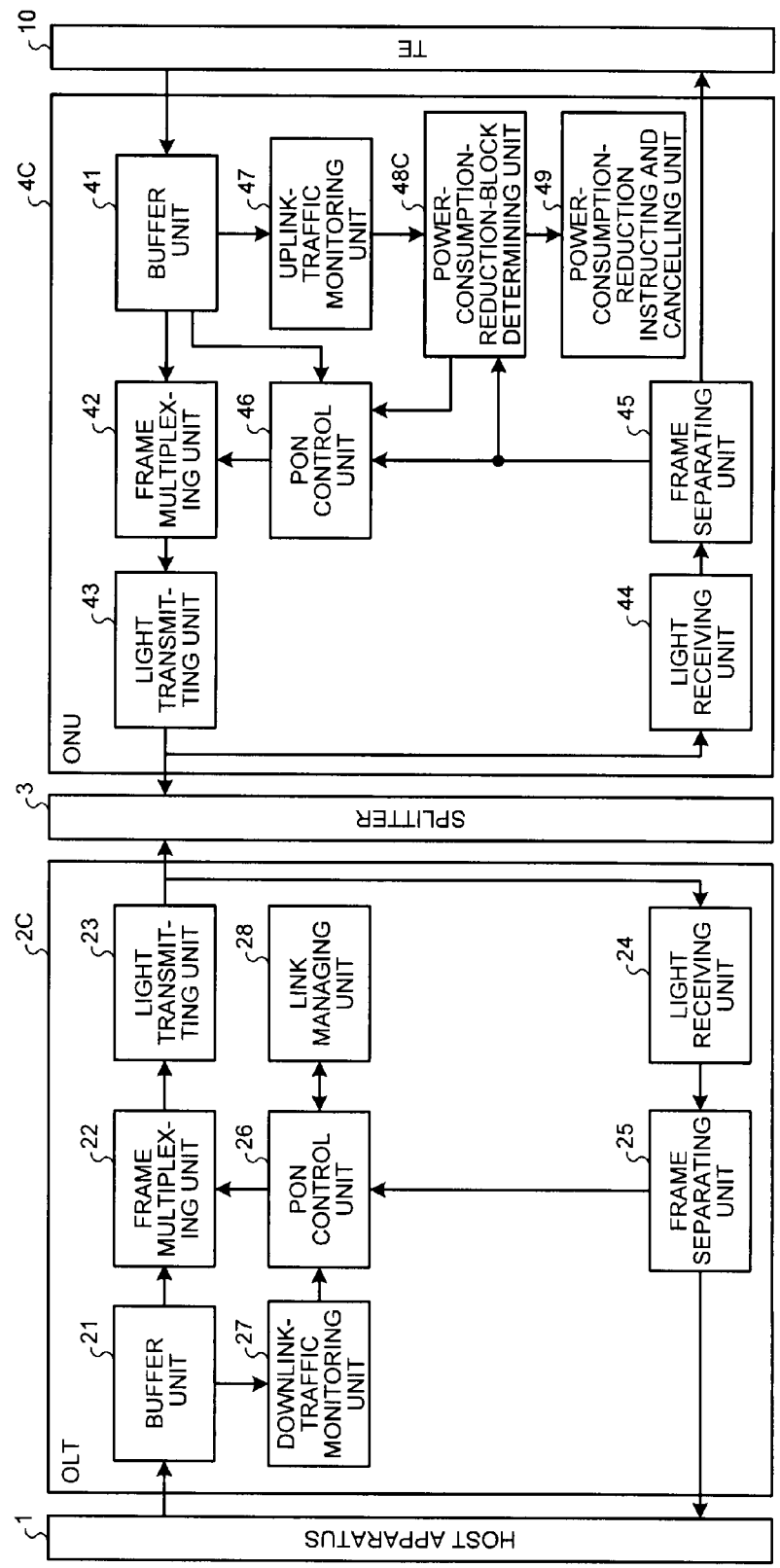
FIG. 3 is a diagram of a configuration example of a PON system according to a third embodiment.

FIG. 3 is a diagram of a configuration example of a PON system according to this embodiment. In the configuration shown in FIG. 3, compared with the configuration shown in FIG. 1, an OLT 2C does not include the power-consumption-reduction determining unit 29. An ONU 4C includes a power-consumption-reduction-block determining unit 48C instead of the power-consumption-reduction-block determining unit 48. The power-consumption-reduction-block determining unit 48C has a function of determining a communication direction subjected to power consumption reduction in addition to the function of the power-consumption-reduction-block determining unit 48.

The operations in the PON system configured as explained above are explained. The operations are divided into cases as explained below based on states of a link in a PON section and states of upstream and downstream traffics.

(Case 2-1) The Link in the PON Section is Established and There is no Traffic Both in an Upstream and a Downstream When the downstream-traffic monitoring unit 27 of the OLT 2C detects that there is no traffic in a downstream direction addressed to the ONU 4C from the host apparatus 1 for a fixed period, the downstream-traffic monitoring unit 27 notifies the PON control unit 26 to that effect. The PON control unit 26 transmits, using the frame multiplexing unit 22 and the light transmitting unit 23, a control frame for notifying to that effect (hereinafter referred to as "traffic notification frame") to the ONU 4.

The power-consumption-reduction-block determining unit 48C of the ONU 4C receives the traffic notification frame via the light receiving unit 44 and the frame separating unit 45. On the other hand, the upstream-traffic monitoring unit 47 of the ONU 4C monitors the buffer unit 41. When the upstream-traffic monitoring unit 47 detects that there is no traffic from the TE 10 for a fixed period, the upstream-traffic monitoring unit 47 notifies the power-consumption-reduction-block determining unit 48C to that effect. When the power-consumption-reduction-block determining unit 48C receives the notification that there is no downstream traffic from the OLT 2C and there is no traffic from the TE 10 in this way, the power-consumption-reduction-block determining unit 48C determines transition to the low power consumption mode concerning both upstream and downstream communication directions to the OLT 2C and instructs the PON control unit to report to the OLT 2C to that effect. The PON control unit transmits a control frame on which the contents (the transition to the low power consumption mode and the communication direction to be transitioned) are written (hereinafter referred to as "transition declaration frame") to the OLT 2C.

After instructing the transmission of the transition declaration frame, the power-consumption-reduction-block determining unit 48C of the ONU 4C autonomously transitions a block for receiving data from the OLT 2C and transmitting the data to the TE 10, a block for receiving data from the TE 10 and transmitting the data to the OLT 2C, and blocks necessary for communication control between the OLT 2C and the ONU 4C to the low power consumption mode. The power-consumption-reduction-block determining unit 48C determines to transition the frame multiplexing unit 42, the light transmitting unit 43, the light receiving unit 44, the frame separating unit 45, the PON control unit 46, the upstream-traffic monitoring unit 47, and the power-consumption-reduction-block determining unit 48C to the low power consumption mode and notifies the power-consumption-reduction instructing and cancelling unit 49 to that effect.

The power-consumption-reduction instructing and cancelling unit 49 of the ONU 4C designates, for example, a low power consumption operation time, which is time determined by the PON system in advance and set in the ONU 4C, and instructs the blocks to transition to the low power consumption mode.

On the other hand, when the PON control unit 26 of the OLT 2C receives the transition declaration frame via the light receiving unit 24 and the frame separating unit 25, the PON control unit 26 recognizes that the ONU 4C transitions to the low power consumption mode. The PON control unit 26 can predict that communication between the apparatus and the ONU 4C is interrupted while the ONU 4C transitions to the low power consumption mode. Therefore, to prevent the link between the OLT 2C and the ONU 4C from being disconnected, the PON control unit 26 stops the processing for monitoring the link until time determined by the PON system in advance and set in the OLT 2C (or time designated in the transition declaration frame transmitted from the ONU 4C) elapses. In other words, the PON control unit 26 stops the periodic inquiry frame transmission to the relevant ONU (the ONU 4C) and maintains a link state stored by the link managing unit 28.

During this time, when traffic addressed to the relevant ONU (the ONU 4C) arrives from the host apparatus 1, the OLT 2C accumulates the traffic in the buffer unit 21.

Similarly, when traffic addressed to the OLT 2C arrives from the TE 10, the ONU 4C accumulates the traffic in the buffer unit 41.

When the low power consumption mode operation time expires in the ONU 4C, the power-consumption-reduction instructing and cancelling unit 49 of the ONU 4C transmits an instruction for cancelling the low power consumption mode to the blocks and activates the blocks. When the low power consumption mode operation time expires in the OLT 2C, the PON control unit 26 of the OLT 2C resumes the periodic inquiry transmission to the relevant ONU (the ONU 4C) to resume the link monitoring.

Consequently, when there are no upstream and downstream traffics in the ONU 4C, it is possible to reduce power consumption of blocks unnecessary for communication between the ONU 4C and the OLT 2C while maintaining the link between the ONU 4C and the OLT 2C. Concerning upstream and downstream traffics that occur during transition to the low power consumption mode, the downstream traffic is accumulated in the buffer unit 21 of the OLT 2C and the upstream traffic is accumulated in the buffer unit 41 of the ONU 4C and the traffics are transmitted and received after cancellation of the low power consumption mode. Therefore, there is an effect that a frame loss does not occur.

(Case 2-2) The Link in the PON Section is Established and Only a Downstream Traffic is Present Operations performed when only a downstream traffic stops are explained. The downstream-traffic monitoring unit 27 of the OLT 2C monitors a data accumulation state of the buffer unit 21. When there is no data addressed to the ONU 4C, the downstream-traffic monitoring unit 27 notifies the PON control unit 26 that there is no traffic addressed to the ONU 4C. The PON control unit 26 transmits a traffic notification frame for notifying that there is no traffic in the downstream direction to the ONU 4C to the ONU 4C via the frame multiplexing unit 22 and the light transmitting unit 23.

When the power-consumption-reduction-block determining unit 48C of the ONU 4C receives the traffic notification frame via the light receiving unit 44 and the frame separating unit 45 in a state in which the power-consumption-reduction-block determining unit 48C is not notified from the upstream-traffic monitoring unit 47 that there is no upstream traffic, the power-consumption-reduction-block determining unit 48C determines that only a downstream traffic is not present. In this case, the power-consumption-reduction-block determining unit 48C determines to transition a block for receiving data from the OLT 2C and transmitting the data to the TE 10 and blocks necessary for communication control with the OLT 2C to the low power consumption mode. The power-consumption-reduction-block determining unit 48C determines the light receiving unit 44, the frame separating unit 45, the PON control unit 46, the upstream-traffic monitoring unit 47, and the power-consumption-reduction-block determining unit 48C as blocks to be transitioned to the low power consumption mode and notifies the power-consumption-reduction instructing and cancelling unit 49 to that effect. The power-consumption-reduction-block determining unit 48C instructs the PON control unit 46 to report to the OLT 2C that the units transition to the low power consumption mode. The PON control unit 46 transmits a transition declaration frame on which the content is written to the OLT 2C.

Upon receiving upstream transmission permission from the OLT 2C explained later, the power-consumption-reduction instructing and cancelling unit 49 of the ONU 4C designates a low power consumption operation time, which is time determined by the PON system in advance or time designated in the transition declaration frame transmitted from the ONU 4C to the OLT 2C, and instructs the blocks to transition to the low power consumption mode.

When the PON control unit 26 of the OLT 2C receives the transition declaration frame, the PON control unit 26 recognizes that the ONU 4C transitions to the low power consumption mode. The OLT 2C can predict that communication between the OLT 2C and the ONU 4C is interrupted while the ONU 4C transitions to the low power consumption mode. Therefore, to prevent the link between the OLT 2C and the ONU 4C from being disconnected, the PON control unit 26 stops the processing for monitoring the link, i.e., the processing of periodic inquiry frame transmission to the relevant ONU (the ONU 4C) until time determined by the PON system in advance and set in the OLT 2C (or time described in the transition declaration frame received from the ONU 4C) elapses.

The ONU 4C transitions the blocks concerning exchange of control information between the ONU 4C and the OLT 2C to the low power consumption mode together with the blocks concerning a downstream traffic. Therefore, because the ONU 4C cannot transmit an inquiry response frame even if an upstream traffic occurs, upstream transmission permission is not obtained. Therefore, the PON control unit 26 of the OLT 2C transmits, according to the low power consumption operation time or the like, upstream transmission permission in future to the ONU 4C using statistic information up to this point stored by the PON control unit 26, minimum bandwidth guarantee information, and the like. Upon receiving the upstream transmission permission via the light receiving unit 44 and the frame separating unit 45, the power-consumption-reduction-block determining unit 48C of the ONU 4C instructs the power-consumption-reduction instructing and cancelling unit 49 to transition to the low power consumption mode.

While the ONU 4C transitions to the low power consumption mode, when traffic addressed to the relevant ONU (the ONU 4C) arrives from the host apparatus 1, the OLT 2C accumulates the traffic in the buffer unit 21.

When the low power consumption operation time in the ONU 4C expires, the power-consumption-reduction instructing and cancelling unit 49 of the ONU 4C instructs the blocks to cancel the low power consumption mode and activates the blocks. On the other hand, when the time in which the ONU 4C transitions to the low power consumption mode expires, the PON control unit 26 of the OLT 2C resumes the periodic transmission of the inquiry frame to the relevant ONU (the ONU 4C) to resume the link monitoring.

Consequently, when there is no downstream traffic, same effects as those in the first embodiment can be obtained.

(Case 2-3) The Link in the PON Section is Established and Only an Upstream Traffic is not Present Operations performed when only an upstream traffic stops are explained. The upstream-traffic monitoring unit 47 of the ONU 4C monitors a data accumulation amount in the buffer unit 41. When there is no upstream data from the TE 10 for a fixed time, the upstream-traffic monitoring unit 47 detects that there is no upstream data and notifies the power-consumption-reduction-block determining unit 48C to that effect. When the power-consumption-reduction-block determining unit 48C is not notified by the traffic notification frame from the OLT 2C that a downstream traffic is not present, the power-consumption-reduction-block determining unit 48C determines, when the notification is received, that only an upstream traffic is not present. Therefore, the power-consumption-reduction-block determining unit 48C determines to transition the upstream direction to the OLT 2C to the low power consumption mode and instructs the PON control unit 46 to transmit a transition declaration frame for notifying to that effect. The PON control unit 46 that receives the instruction transmits the transition declaration frame to the OLT 2C via the light receiving unit 44 and the frame separating unit 45.

The power-consumption-reduction-block determining unit 48C of the ONU 4C determines to transition a block for transmitting data from the TE 10 to the OLT 2C and blocks necessary for communication control between the ONU 4C and the OLT 2C for time determined in advance or a low power consumption operation time, which is time described in the transition declaration frame transmitted to the OLT 2C. The power-consumption-reduction-block determining unit 48C determines the frame multiplexing unit 42, the light transmitting unit 43, the PON control unit 46, the upstream-traffic monitoring unit 47, and the power-consumption-reduction-block determining unit 48C as blocks to be transitioned to the low power consumption mode and notifies the power-consumption-reduction instructing and cancelling unit 49 to that effect.

The power-consumption-reduction instructing and cancelling unit 49 designates the low power consumption operation time and instructs the blocks to transition to the low power consumption mode.

When the PON control unit 26 of the OLT 2C receives the transition declaration frame, the PON control unit 26 recognizes that the ONU 4C transitions to the low power consumption mode. The PON control unit 26 can predict that communication between the OLT 2C and the ONU 4C is interrupted while the ONU 4C transitions to the low power consumption mode. Therefore, to prevent the link between the OLT 2C and the ONU 4C from being disconnected, the PON control unit 26 stops the processing for monitoring the link until time determined by the PON system in advance and set in the OLT 2C (or time designated in the transition declaration frame received from the ONU 4C) elapses. In other words, the PON control unit 26 stops the periodic inquiry frame transmission to the relevant ONU (the ONU 4C) and maintains a link state stored by the link managing unit 28.

When traffic addressed to the OLT 2C arrives from the TE 10 in the ONU 4C until the low power consumption operation time elapses, the buffer unit 41 accumulates data. When the low power consumption operation time expires, the power-consumption-reduction instructing and cancelling unit 49 of the ONU 4C instructs the blocks to cancel the low power consumption mode and activates the blocks. On the other hand, in the OLT 2C, when the time in which the ONU 4C transitions to the low power consumption mode expires, the PON control unit 26 resumes the periodic inquiry frame transmission to the relevant ONU (the ONU 4C) to resume the link monitoring.

Consequently, when there is no upstream traffic from the ONU, same effects as those in the first embodiment can be obtained.

In the operations performed when traffic stops only in the upstream, the periodic inquiry processing from the OLT to the relevant ONU is stopped. However, the periodic inquiry can be continuously carried out while the link is maintained in the link managing unit 28. Specific operations are same as those explained above.

(Case 2-4) The Link in the PON Section is Disconnected

Lastly, operations performed when the link between the ONU 4C the OLT 2C is disconnected are explained. As explained above, to maintain the link, the OLT 2C and the ONU 4C periodically exchange inquiry frames and inquiry response frames between the PON control units of the OLT 2C and the ONU 4C, check contents of the frames, and perform data communication only when the link is maintained.

When the power-consumption-reduction-block determining unit 48C of the ONU 4C does not detect the inquiry frame for a fixed time, the power-consumption-reduction-block determining unit 48C determines the blocks except only the frame multiplexing unit 42, the light transmitting unit 43, the light receiving unit 44, the frame separating unit 45, and the PON control unit 46, which are blocks necessary for communication control with the OLT 2C, as blocks to be transitioned to the low power consumption mode and notifies the power-consumption-reduction instructing and cancelling unit 49 to that effect.

The power-consumption-reduction instructing and cancelling unit 49 instructs the relevant blocks to transition to the low power consumption mode until the link of the PON (the link between the ONU 4C and the OLT 2C) is recovered. When the link is recovered and an inquiry frame is received from the OLT 2C via the light receiving unit 44 and the frame separating unit 45, the power-consumption-reduction-block determining unit 48C of the ONU 4C instructs the power-consumption-reduction instructing and cancelling unit 49 to cancel the low power consumption mode. The power-consumption-reduction instructing and cancelling unit 49 that receives the instruction issues an instruction for transition cancellation to the blocks and activates the units.

Consequently, when the link between the ONU 4C and the OLT 2C is disconnected, same effects as those in the first embodiment can be obtained.

As explained above, in this embodiment, the ONUs monitor upstream traffics from the ONUs to the OLT and the OLT monitors downstream traffics from the OLT to the ONUs. According to results of the monitoring, the ONU is configured to determine a communication direction and blocks to be transitioned to the low power consumption mode. In this case, as in the first and second embodiments, it is possible to reduce power consumption in the ONU while maintaining the link between the OLT and the ONU or maintaining a state in which the OLT and the ONU can be linked.

Fourth Embodiment

In the third embodiment, the OLT monitors downstream traffics between the OLT and the ONUs. In a fourth embodiment, it is described that the ONU monitors downstream traffics.

Figure 4:
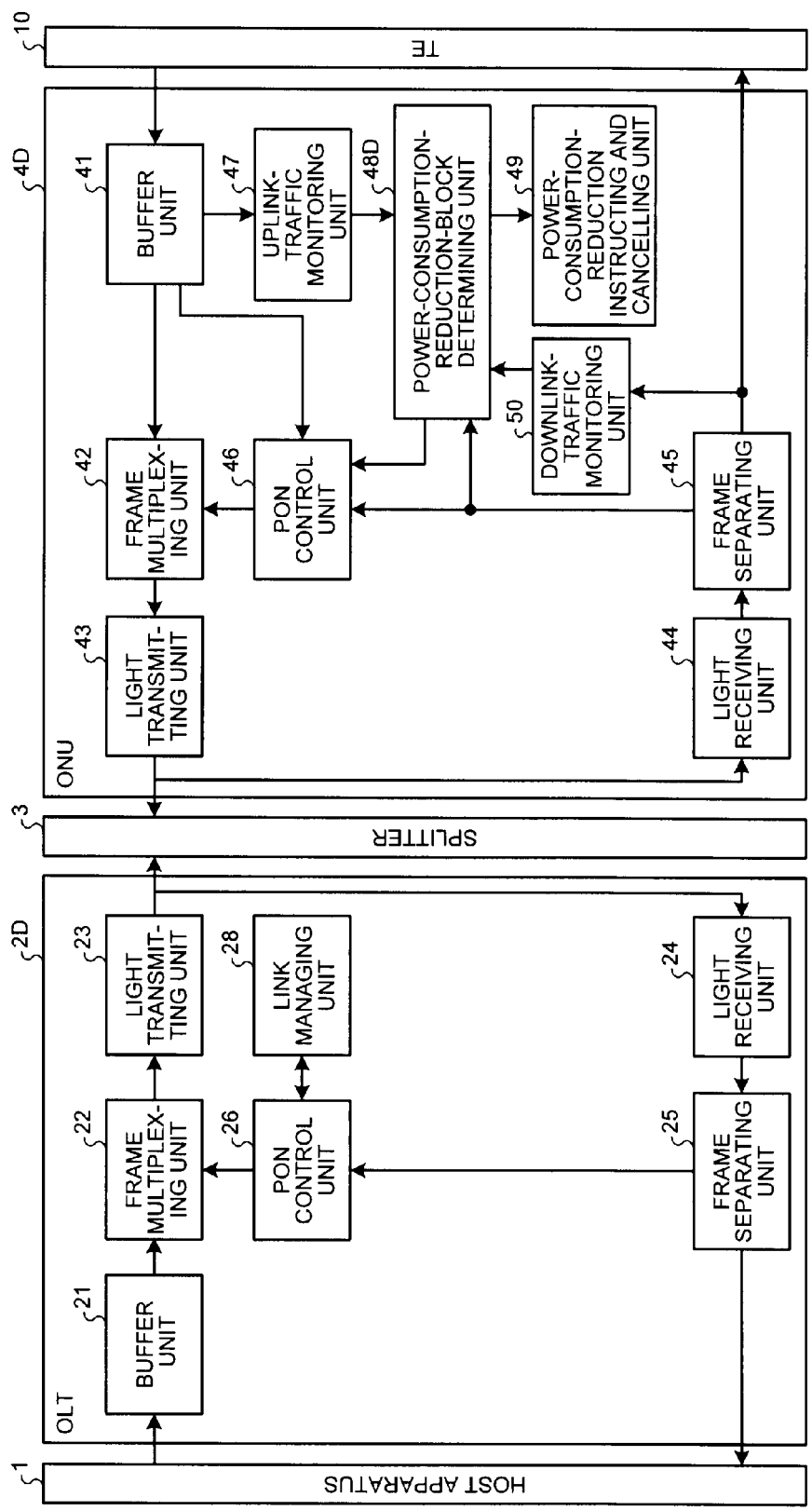
FIG. 4 is a diagram of a configuration example of a PON system according to a fourth embodiment.

FIG. 4 is a diagram of a configuration example of a PON system according to this embodiment. In the configuration shown in FIG. 4, compared with the configuration shown in FIG. 3, the PON system includes an OLT 2D instead of the OLT 2C and includes an ONU 4D instead of the ONU 4C. The OLT 2D does not include the downstream-traffic monitoring unit 27. Instead, the ONU 4D includes a downstream-traffic monitoring unit 50. The downstream-traffic monitoring unit 50 is provided for the purpose of monitoring an upstream traffic from the OLT 2D.

The downstream-traffic monitoring unit 50 of the OLT 4D monitors a user frame transmitted to the TE 10 via the light receiving unit 44 and the frame separating unit 45. Consequently, the downstream-traffic monitoring unit 50 plays a function equivalent to that of the downstream-traffic monitoring unit 27 shown in FIG. 3.

Operations in the PON system configured as explained above are explained. In an example explained below, only a downstream traffic from the OLT 2D to the ONU 4D stops.

The downstream-traffic monitoring unit 50 of the ONU 4D monitors a user frame transmitted to the TE 10 via the light receiving unit 44 and the frame separating unit 45. When the downstream-traffic monitoring unit 50 does not detect a user frame for a fixed period, the downstream-traffic monitoring unit 50 determines that there is no downstream traffic and notifies the power-consumption-reduction-block determining unit 48C to that effect. The power-consumption-reduction-block determining unit 48C that receives the notification determines transition to the low power consumption mode only in an upstream direction to the OLT 2D and instructs the PON control unit 26 to notify to that effect. The PON control unit 26 transmits a transition declaration frame for declaring the transition to the low power consumption mode concerning the upstream direction to the OLT 2D.

As in the "case 2-3" of the third embodiment, the ONU 4D performs processing for transition to the low power consumption mode. Thereafter, when a low power consumption operation time in the ONU 4D expires, as explained above, the power-consumption-reduction instructing and cancelling unit 49 of the ONU 4D instructs cancellation of the low power consumption mode and activates the blocks. On the other hand, in the OLT 2D, when the time in which the ONU 4D transitions to the low power consumption mode expires, the PON control unit 26 resumes the periodic transmission of an inquiry frame to the relevant ONU (the ONU 4) to resume the link monitoring.

As explained above, in this embodiment, the ONU monitors both an upstream traffic from the ONU to the OLT and a downstream traffic from the OLT to the ONU. According to results of the monitoring, the ONU is configured to determine a communication direction and blocks to be transitioned to the low power consumption mode. In this case, as in the third embodiment, it is possible to reduce power consumption in the ONU while maintaining a link between the OLT and the ONU or maintaining a state in which the OLT and the ONU can be linked.

INDUSTRIAL APPLICABILITY

As explained above, the PON system according to the present invention is useful as a PON system that provides a service requiring real time property and is, in particular, suitable when a link is maintained even while data communication is not performed.

The invention claimed is:

1. An optical line terminal (OLT) that configures a passive optical network (PON) system in cooperation with an optical network unit (ONU), the OLT comprising:
   a controller to control a link state with the ONU, wherein the controller:
   generates, in one case, a control signal specifying a first low power consumption mode in which the ONU operates in the low power consumption mode in an upstream direction,
   generates, in another case, the control signal specifying a second low power consumption mode in which the ONU operates in the low power consumption mode in both upstream and downstream directions, transmits, to the ONU, the generated control signal which controls whether the ONU operates in the first low power consumption mode and whether the ONU operates in the second low power consumption mode,
monitors whether a link between the OLT and the ONU is in an established state based on periodic inquiry frame transmissions, wherein data communication between the OLT and the ONU is allowed to be performed only when the link is in the established state,
stops the monitoring, based on the periodic inquiry frame transmissions, of whether the link is in the established state to maintain a current link state between the OLT and the ONU, when the ONU operates in the first low power consumption mode and the second low power consumption mode based on the control signal transmitted from the OLT, and
transmits, to the ONU, an inquiry about an upstream bandwidth allocation and receives a message concerning a release of the low power consumption mode of the ONU transmitted from the ONU in a predetermined period in which the ONU can respond to the inquiry when the ONU operates in the first low power consumption mode.

2. The optical line terminal (OLT) according to claim 1, wherein:
when the ONU operates in the first low power consumption mode in the upstream direction, the controller of the OLT allocates an upstream bandwidth to the ONU.

3. The optical line terminal (OLT) according to claim 1, wherein:
when the ONU operates in at least one of the first and the second low power consumption mode based on the control signal transmitted from the controller of the OLT, the controller of the OLT maintains the link state between the OLT and the ONU by the controller of the OLT transmitting a control frame for inquiring an accumulated data amount to the ONU.

4. The OLT according to claim 1, wherein the OLT transfers a downstream traffic to the ONU when the ONU operates in the first low power consumption mode.

5. A communication system comprising an optical line terminal (OLT) and an optical network unit (ONU), the communication system performing communication in a state in which the OLT and the ONU are linked, wherein
the OLT includes:
a controller to control a link state with the ONU, wherein the controller:
generates, in one case, a control signal specifying a first low power consumption mode in which the ONU operates in the low power consumption mode in an upstream direction,
generates, in another case, the control signal specifying a second low power consumption mode in which the ONU operates in the low power consumption mode in both upstream and downstream directions,
transmits, to the ONU, the generated control signal which controls whether the ONU operates in the first low power consumption mode and whether the ONU operates in the second low power consumption mode,
monitors whether a link between the OLT and the ONU is in an established state based on periodic inquiry frame transmissions, wherein data communication between the OLT and the ONU is allowed to be performed only when the link is in the established state,
stops the monitoring, based on the periodic inquiry frame transmissions, of whether the link is in the established state to maintain a current link state between the OLT and the ONU, when the ONU operates in the first low power consumption mode and the second low power consumption mode based on the control signal transmitted from the OLT, and
transmits, to the ONU, an inquiry about an upstream bandwidth allocation and receives a message concerning a release of the low power consumption mode of the ONU transmitted from the ONU in a predetermined period in which the ONU can respond to the inquiry when the ONU operates in the first low power consumption mode,
the ONU includes:
a receiver that receives the control signal transmitted from the OLT; and
a controller that executes the transition to the low power consumption mode based on the control signal received by the receiver.

6. A communication method for a communication system including an optical line terminal (OLT) and an optical network unit (ONU), the communication system performing communication in a link state in which the OLT and the ONU are linked, the communication method comprising:
monitoring, by the OLT, whether a link between the OLT and the ONU is in an established state based on periodic inquiry frame transmissions, wherein data communication between the OLT and the ONU is allowed to be performed only when the link is in the established state;
generating, by the OLT, a control signal concerning transition to a low power consumption mode of the ONU, the generating including:
generating, in one case, a control signal specifying a first low power consumption mode in which the ONU operates in the low power consumption mode in an upstream direction, and
generating, in another case, the control signal specifying a second low power consumption mode in which the ONU operates in the low power consumption mode in both upstream and downstream directions;
transmitting, by the OLT to the ONU, the generated control signal which controls whether the ONU operates in the first low power consumption mode and whether the ONU operates in the second low power consumption mode;
receiving, by the ONU, the transmitted control signal;
transitioning the ONU to the low power consumption mode based on the received control signal;
stopping the monitoring, based on the periodic inquiry frame transmissions, of whether the link is in the established state to restrain a current link state from becoming discontinued when the ONU transitioned to the low power consumption mode operates in the first lower power consumption mode and the second lower power consumption mode; and
transmitting, to the ONU, an inquiry about an upstream bandwidth allocation and receiving a message concerning a release of the low power consumption mode of the ONU transmitted from the ONU in a predetermined period in which the ONU can respond to the inquiry when the ONU operates in the first low power consumption mode.

7. The OLT according to claim 1, wherein the controller of the OLT allocates upstream bandwidth to the ONU when the ONU operates in at least one of the first and the second low power consumption mode.

8. The OLT according to claim 1, wherein the controller of the OLT is further configured to perform the processing to monitor the link between the OLT and the ONU by periodically transmitting inquiry frames to the ONU and periodically receiving inquiry response frames from the ONU.

9. The communication system according to claim 5, wherein the controller of the OLT is further configured to perform the processing to monitor the link between the OLT and the ONU by periodically transmitting inquiry frames to the ONU and periodically receiving inquiry response frames from the ONU.

10. The communication method according to claim 6, further comprising:
    performing, by the OLT, the processing to monitor the link between the OLT and the ONU by periodically transmitting inquiry frames to the ONU and periodically receiving inquiry response frames from the ONU.

* * * * *